(12) United States Patent  
Maug et al.

(10) Patent No.: US 10,749,347 B2
(45) Date of Patent: Aug. 18, 2020

(54) COMBINATION WIND/SOLAR DC POWER SYSTEM

(71) Applicant: Pitt-Ohio Express LLC, Pittsburgh, PA (US)

(72) Inventors: James A. Maug, Sewickley, PA (US); James P. Fields, Rochester Hills, MI (US)

(73) Assignee: Pitt-Ohio Express LLC, Pittsburgh, PA (US)

( * ) Notice: Subject to any disclaimer, the term of this patent is extended or adjusted under 35 U.S.C. 154(b) by 661 days.

(21) Appl. No.: 15/433,302

(22) Filed: Feb. 15, 2017

(65) Prior Publication Data

US 2017/0237261 A1    Aug. 17, 2017

Related U.S. Application Data

(60) Provisional application No. 62/295,349, filed on Feb. 15, 2016.

(51) Int. Cl.
*H02J 3/38* (2006.01)
*H02J 7/35* (2006.01)
(Continued)

(52) U.S. Cl.
CPC .............. *H02J 3/383* (2013.01); *H02J 3/386* (2013.01); *H02J 7/35* (2013.01); *H02J 1/08* (2013.01);
(Continued)

(58) Field of Classification Search
CPC ...................................................... H02J 3/383
See application file for complete search history.

(56) References Cited

U.S. PATENT DOCUMENTS 8,970,176 B2    3/2015  Ballatine et al.
9,853,490 B2 *  12/2017  Adest ...................... H02J 1/102
(Continued)

FOREIGN PATENT DOCUMENTS

CA          2771760 A1 * 10/2012  ................ H02J 3/02
WO    WO 2015/193041 A1    12/2015

OTHER PUBLICATIONS

Bullis, Kevin. "How to Make a Cheap Battery for Storing Solar Power", Feb. 18, 2014, MIT Technology Review. https://www.technologyreview.com/s/524466/storing-the-sun/ (Year: 2014).*
(Continued)

*Primary Examiner* — Daniel J Cavallari
(74) *Attorney, Agent, or Firm* — K&L Gates LLP

(57) ABSTRACT

A direct current power system. The direct current power system includes a direct current bus system, a solar power system, an energy storage system, a wind power system, a rectifier system and an inverter system. The solar power system includes a plurality of solar panels, is electrically coupled to the energy storage system and is configured to supply a first direct current power at 48 volts. The energy storage system includes a plurality of battery stacks and is configured to supply a second direct current power at 380 volts to the direct current bus system. The wind power system includes at least one wind turbine assembly and is configured to supply a third direct current power at 380 volts to the direct current bus system. The rectifier system is configured to supply a fourth direct current power at 380 volts to the direct current bus system.

20 Claims, 10 Drawing Sheets

(51) Int. Cl.
*H02J 1/08* (2006.01)
*H02J 4/00* (2006.01)

(52) U.S. Cl.
CPC ............. *H02J 1/082* (2020.01); *H02J 4/00* (2013.01); *Y02E 10/563* (2013.01); *Y02E 10/566* (2013.01); *Y02E 10/763* (2013.01); *Y02E 10/766* (2013.01); *Y02P 90/50* (2015.11)

(56) References Cited

U.S. PATENT DOCUMENTS

| | | | |
|---|---|---|---|
| 2007/0246943 A1* | 10/2007 | Chang | H02J 3/28 290/44 |
| 2010/0196748 A1 | 8/2010 | Ellwanger | |
| 2011/0148194 A1* | 6/2011 | Lai | H02J 7/0055 307/23 |
| 2011/0148213 A1 | 6/2011 | Baldwin et al. | |
| 2011/0173853 A1* | 7/2011 | Leveque | F03D 3/02 40/541 |
| 2012/0267952 A1* | 10/2012 | Ballatine | H02J 1/102 307/26 |
| 2012/0326516 A1 | 12/2012 | Gurunathan et al. | |
| 2012/0326668 A1 | 12/2012 | Ballatine et al. | |
| 2013/0234512 A1* | 9/2013 | Kinjo | H02M 3/1588 307/25 |
| 2014/0062192 A1* | 3/2014 | Vichnyakov | H02J 3/385 307/26 |
| 2014/0117965 A1 | 5/2014 | Shankar et al. | |
| 2016/0126741 A1* | 5/2016 | Ito | H02J 1/102 307/82 |
| 2016/0329719 A1* | 11/2016 | Meyer | H02J 3/383 |

OTHER PUBLICATIONS

Wikipedia contributors. (Sep. 16, 2018). Charge controller. In Wikipedia, The Free Encyclopedia. Retrieved 22:25, Aug. 30, 2019, from https://en.wikipedia.org/w/index.php?title=Charge_controller&oldid=859825974 (Year: 2019).*
Drouilhet, Stephen, et al. Optimizing small wind turbine performance in battery charging applications. No. NREL/TP-441-7808; CONF-950309-8. National Renewable Energy Lab., Golden, CO (United States), 1995. (Year: 1995).*
International Search Report for International Application No. PCT/US2017/017905, dated May 1, 2017.
Written Opinion for International Application No. PCT/US2017/017905, dated May 1, 2017.
Kusakana et al., "Hybrid diesel generator/renewable energy system performance modeling", Renewable Energy, vol. 67, Dec. 9, 2013, pp. 97-102.
Wang et al., "A 3.6kV High Performance Solid State Transformer Based on 13kV SIC MOSFET", 2014 IEEE 5th International Symposium on Power Electronics for Distributed Generation Systems, Jun. 24, 2014, 8 pages.
Extended European Search Report for European Application No. 17753728.9 dated Sep. 16, 2019.

* cited by examiner

COMBINATION WIND/SOLAR DC POWER SYSTEM

CROSS-REFERENCE TO RELATED APPLICATIONS

This application claims the benefit under 35 U.S.C. § 119(e) of the earlier filing date of U.S. Provisional Patent Application No. 62/295,349 filed on Feb. 15, 2016, the entire contents of which are hereby incorporated by reference.

BACKGROUND

This application discloses an invention which is related, generally and in various aspects, to a combination wind/solar DC power system.

Currently, a significant amount of the electrical power generated by utility companies utilize nonrenewable sources of energy (e.g., coal, petroleum, natural gas) to generate the electrical power. For a variety of reasons, many people throughout the world believe it would be prudent to wean away from nonrenewable sources of energy and utilize renewable sources of energy (e.g., solar, wind, etc.) to generate electrical power.

The electrical power generated by utility companies is generated as alternating current (AC) power and subsequently transmitted over a transmission grid and a distribution grid to end users. In homes, commercial buildings and industrial facilities, the AC power is typically distributed throughout the electrical distribution system of the home/building/facility as AC power. However, since there are many types of electrical equipment (appliances, computers, data centers, light-emitting diode lighting fixtures, etc.) in the homes/buildings/facilities which require direct current (DC) power to properly operate, the AC power has to be converted to DC power for such electrical equipment, and the required conversion results in substantial power loss and wasted energy.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
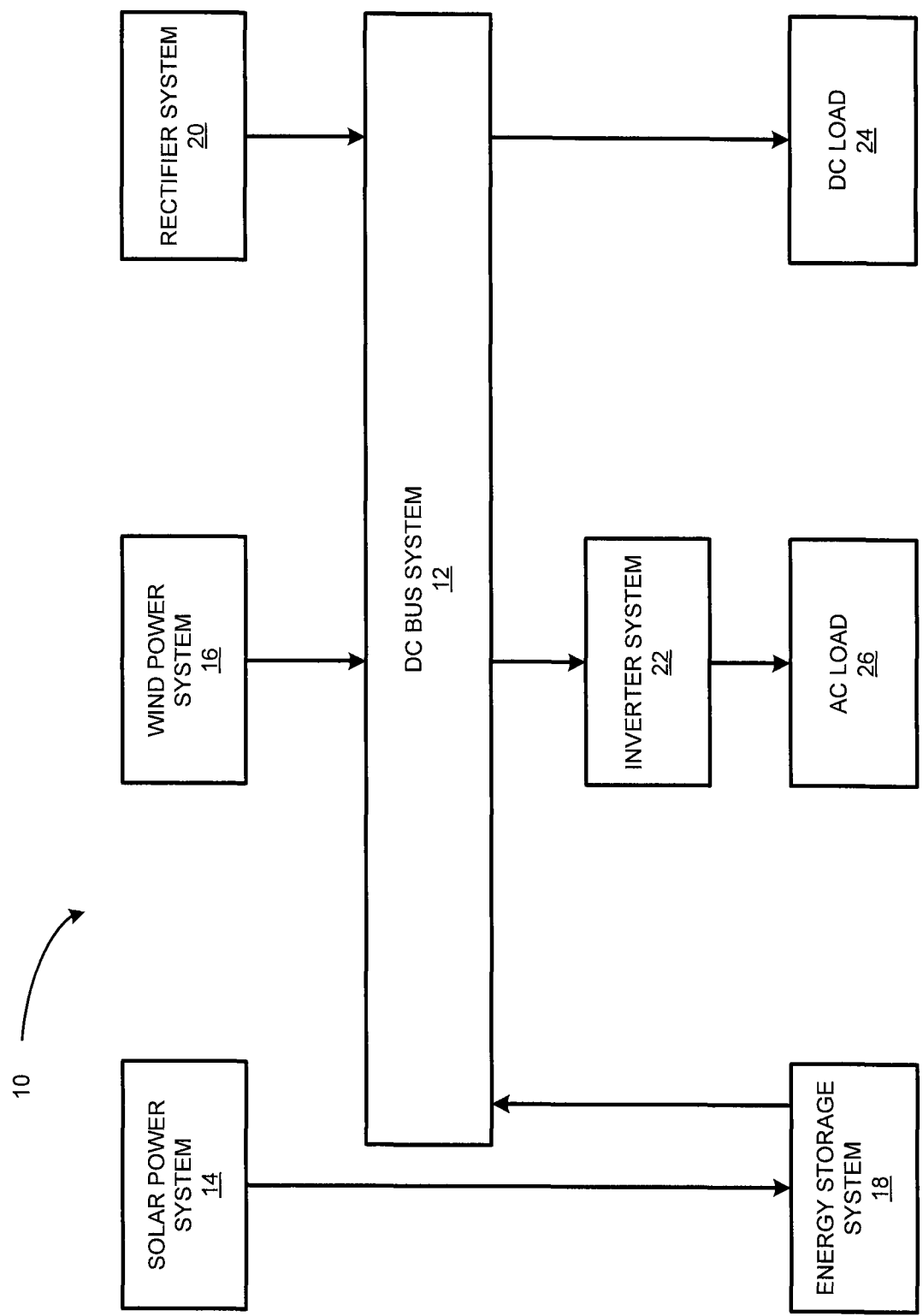
FIG. 1 illustrates a simplified representation of a DC power system according to various aspects.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the DC power system in detail, it should be noted that the various aspects disclosed herein are not limited in their application or use to the details of construction and arrangement of parts illustrated in the accompanying drawings and description. Rather, the disclosed aspects may be positioned or incorporated in other aspects, variations and modifications thereof, and may be practiced or carried out in various ways. Accordingly, aspects of the DC power system disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as outward, inward, above and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

FIG. 1 illustrates a simplified representation of a direct current (DC) power system 10 according to various aspects. The DC power system 10 includes a DC bus system 12, a solar power system 14, a wind power system 16 and an energy storage system 18. According to various aspects, the DC power system 10 also includes a rectifier system 20 and/or an inverter system 22.

The DC power system 10 may be utilized to provide DC power to a DC load 24 electrically coupled to the DC power system 10. For purposes of simplicity, the DC power system 10 will be described hereinafter in the context of being configured to provide 380 volts of DC power to the DC load 24. However, it will be appreciated that the DC power system 10 may be configured to provide DC voltages other than 380 VDC to the DC load 24. For aspects which include the inverter system 22, the DC power system 10 may also be configured to provide alternating current (AC) power to an AC load 26 electrically coupled to the DC power system 10.

Although only one DC load 24 is shown in FIG. 1 as being electrically coupled to the DC power system 10, it will be appreciated that any number of DC loads may be electrically coupled to the DC power system 10. Similarly, although only one AC load 26 is shown in FIG. 1 as being electrically coupled to the DC power system 10, it will be appreciated that any number of AC loads may be electrically coupled to the DC power system 10.

Although not shown for purposes of clarity in FIG. 1, it will be appreciated that the DC bus system 12 includes a first conductor and a second conductor. In general, the first conductor is positively charged relative to the second conductor. Thus, the first conductor may considered as the $+V_{DC}$ conductor of the DC bus system 12 and the second conductor may be considered as the $-V_{DC}$ conductor of the DC bus system 12. Although the electrical connections to the DC bus system 12 are shown in FIG. 1 as single line connections, it will be appreciated that sub-systems of the DC power system 10 which are connected to the DC bus system 12 each have two electrical connections to the DC bus system 12—one to the $+V_{DC}$ conductor and one to the $-V_{DC}$ conductor.

According to various aspects, the DC bus system 12 is configured to carry 380 VDC of DC power. According to other aspects, the DC bus system 12 is configured to carry more than or less than 380 VDC of DC power. According to various aspects, the configuration and functionality of the DC bus system 12 is similar or identical to the StarLine B250 Amp Busway manufactured by Universal Electric Corporation.

The DC load 24 is electrically coupled to the DC bus system 12 via an appropriately sized circuit breaker and/or disconnect switch (not shown). The DC load 24 may be any suitable type of DC load. For example, according to various aspects, the DC load 24 is a data center which includes components (e.g., servers) which require 380 volts of DC power to properly operate. According to other aspects, the DC load 24 is a lighting load (e.g., LED lighting fixtures) or other load which require 380 volts of DC power to properly operate.

The DC power system 10 may also be utilized with DC loads 24 which require more than or less than 380 VDC. For aspects where the DC load 24 requires more than 380 VDC, the DC power system 10 may further include a DC-DC converter (not shown) which boosts the 380 VDC provided by the DC bus system 12 to a DC voltage suitable for the DC load 24. For aspects where the DC load 24 requires less than 380 VDC, the DC power system 10 may further include a DC-DC converter (not shown) which reduces the 380 VDC provided by the DC bus system 12 to a DC voltage suitable for the DC load 24.

Figure 2:
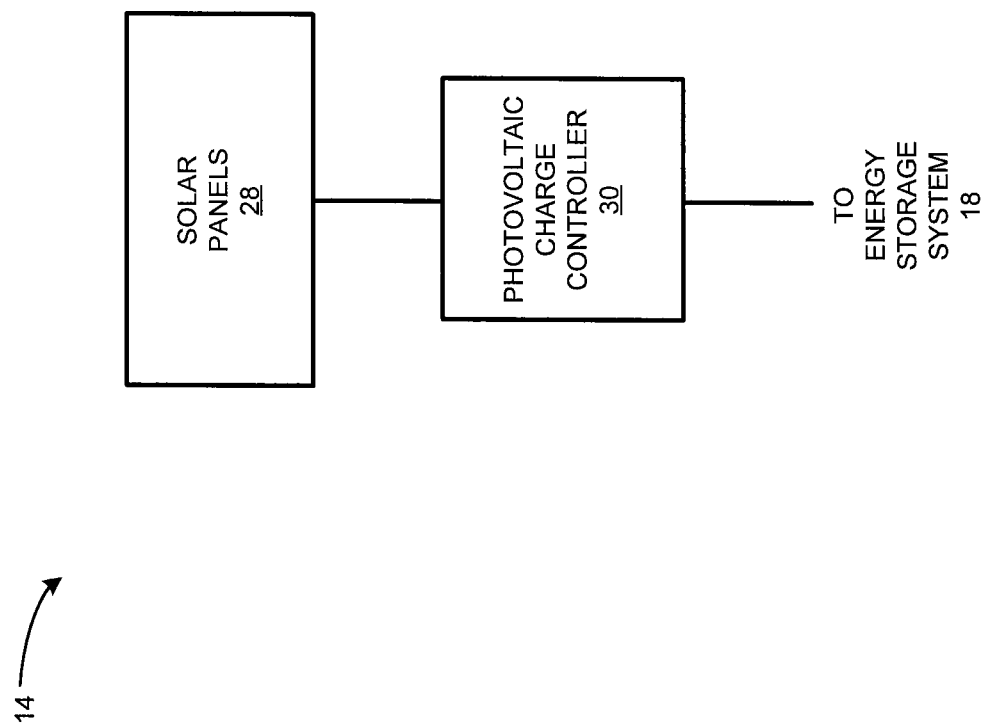
FIG. 2 illustrates a simplified representation of a solar power system of the DC power system of FIG. 1 according to various aspects.

FIG. 2 illustrates a simplified representation of the solar power system 14 according to various aspects. The solar power system 14 is electrically coupled to the energy storage system 18 via an appropriately sized circuit breaker and/or disconnect switch (not shown) and includes a plurality of solar panels 28 and a photovoltaic charge controller 30.

The solar panels 28 may be any suitable type of solar panel. For example, according to various aspects the configuration and functionality of the solar panels 28 are similar or identical to the Sunmodule Plus SW 280 Mono solar panels manufactured by SolarWorld. Although the plurality of solar panels 28 are shown as a single block in FIG. 2 for purposes of simplicity, it will be appreciated that the solar power system 14 may include any number of solar panels 28 and the solar panels 28 may be arranged in any suitable manner. For example, according to various aspects the solar power system 14 is a 50 kilowatt system which includes one-hundred eighty high-efficiency monocrystalline photovoltaic solar panels 28 arranged into six arrays of thirty solar panels 28 each (or twelve arrays of fifteen solar panels 28 each), where each solar panel 28 nominally generates 280 watts of power at 31.2 volts.

The output side of the plurality of solar panels 28 are electrically coupled to the photovoltaic charge controller 30 via the appropriately sized circuit breaker and/or disconnect switch (not shown), and the output side of the photovoltaic charge controller 30 is coupled to an input side of the energy storage system 18. The photovoltaic charge controller 30 may be any suitable type of charge controller. The photovoltaic charge controller 30 is configured to boost the nominal voltage generated by the solar panels 28 to a voltage suitable for the energy storage system 18 (e.g., 48 VDC). For example, the photovoltaic charge controller 30 may boost the output voltage of the plurality of solar panels 28 to a DC voltage which is slightly over the existing voltage of the energy storage system 18 and then maintain a voltage higher than the voltage of the energy storage system 18 in order to "push" current from the solar power system 14 to the energy storage system 18. According to various aspects, the photovoltaic charge controller 30 also includes internal controls which prevents the photovoltaic charge controller 30 from "pushing" too much current from the solar power system 14 to the energy storage system 18.

Figure 3:
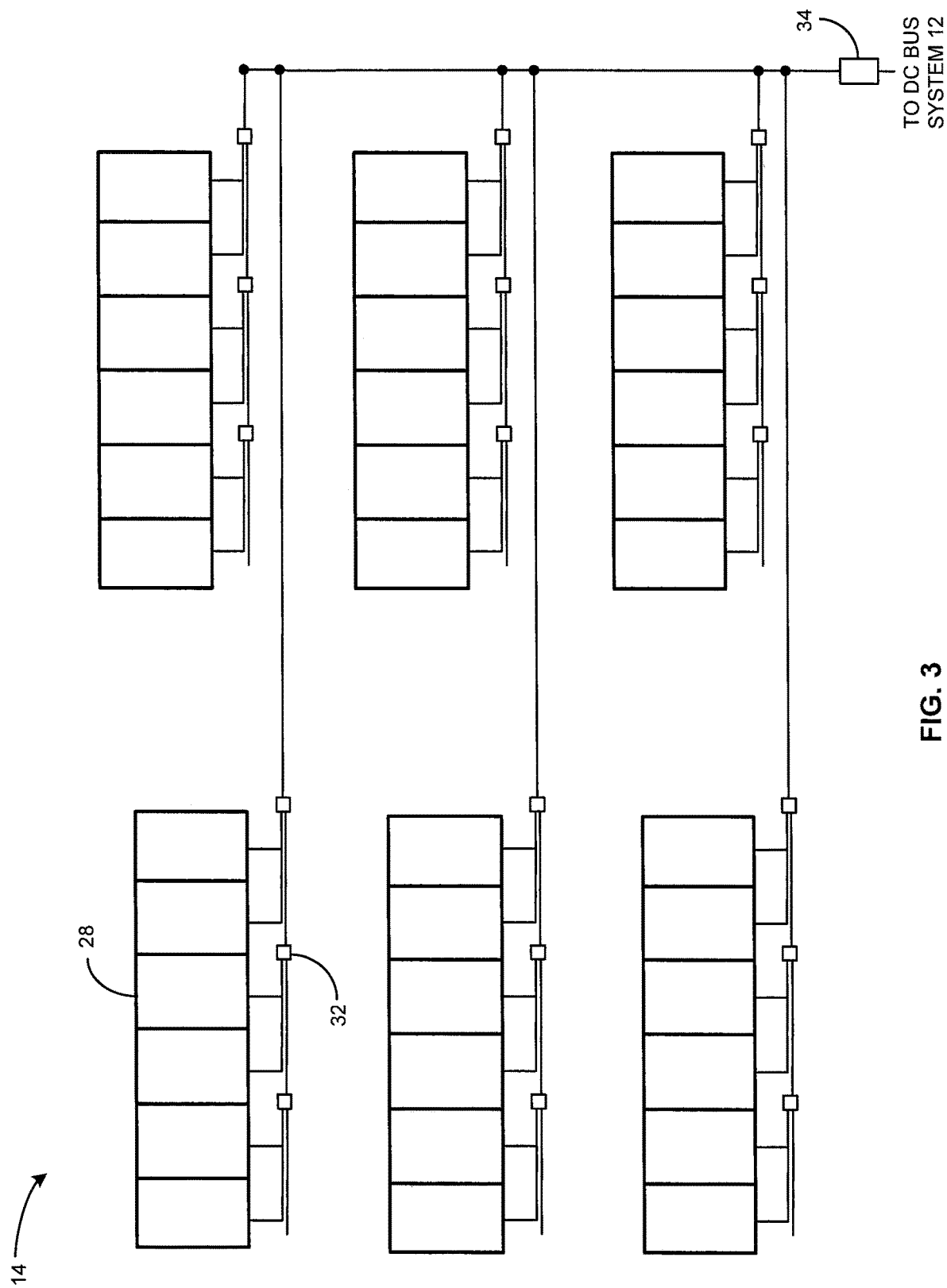
FIG. 3 illustrates a solar power system of the DC power system of FIG. 1 according to other aspects.

FIG. 3 illustrates the solar power system 14 according to other aspects. For these aspects, in lieu of being coupled to the energy storage system 18 as described above with reference to FIG. 2, the solar power system 14 is coupled to the DC bus system 12 via an appropriately sized circuit breaker and/or disconnect switch (not shown) and includes a plurality of solar panels 28 and a plurality of DC-DC converters 32. According to various aspects, the solar power system 14 also includes a communications unit 34.

The solar panels 28 may be similar or identical to those described above with reference to FIG. 2. Although the solar power system 14 is shown in FIG. 3 as including thirty-six solar panels 28, arranged in six arrays, it will be appreciated that the solar power system 14 may include any number of solar panels 28 and the solar panels 28 may be arranged into any number of arrays. For example, according to various aspects, the solar power system 14 is a 50 kilowatt system which includes one-hundred eighty high-efficiency monocrystalline photovoltaic solar panels 28 arranged into three arrays of sixty solar panels 28 each (or six arrays of six solar panels 28 each), where each solar panel 28 nominally generates 280 watts of power at 31.2 volts.

The DC-DC converters 32 are configured to boost the nominal voltage generated by the individual solar panels 28. The solar system 14 may include any number of DC-DC converters 32. For example, as shown in FIG. 3, according to various aspects, the solar power system 14 includes one DC-DC converter 32 for every two solar panels 28, wherein each DC-DC converter 32 is electrically connected to the outputs of two of the solar panels 28. The DC-DC converters 32 are electrically coupled to one another in parallel and are configured to collectively boost the output voltage of the plurality of solar panels 28 to a DC voltage suitable for the DC bus system 12. For example, according to various aspects, the DC-DC converters 32 are configured to collectively boost the output voltage from the plurality of solar panels 28 to 380 VDC. According to various aspects, the DC-DC converters 32 may also serve as charge controllers for the solar power system 14 by boosting the output voltage of the plurality of solar panels 28 to a DC voltage which is slightly over the existing voltage of the DC bus system 12 and then maintaining a voltage higher than the voltage of the DC bus system 12 in order to "push" current from the solar power system 14 to the DC bus system 12. According to various aspects, the DC-DC converters 32 also include internal controls which prevent the DC-DC converters from "pushing" too much current from the solar power system 14 to the DC bus system 12. According to various aspects, if the energy storage system 18 is fully charged and there is no load electrically coupled to the DC bus system 12, the DC-DC converters 32 may be deactivated. The DC-DC converters 32 may be any suitable type of DC-DC boost converters. According to various aspects, the configuration and functionality of the DC-DC converters 32 are similar or identical to the vBoost 600 DC-to-DC converter modules manufactured by eIQ Energy, Inc.

For aspects which do not include the communications unit 34, one of the DC-DC converters 32 from each array of solar panels 28 may be electrically coupled to the DC bus system 12 via an appropriately sized circuit breaker and/or disconnect switch (not shown). For aspects which do include the communications unit 34, the communications unit 34 is electrically coupled to a plurality of the DC-DC converters 32 (coupled to one DC-DC converter 32 for each array of solar panels 28), and is also electrically coupled to the DC bus system 12 via an appropriately sized circuit breaker and/or disconnect switch (not shown). According to various aspects, if the energy storage system 18 is fully charged and there is no load electrically coupled to the DC bus system 12, the communications unit 34 may sense this condition and operate to deactivate the DC-DC converters 32. According to various aspects, the communications unit 34 is configured to monitor the performance of the solar panels 28 and DC-DC converters 32, and to communicate performance information regarding the solar panels 28 and the DC-DC converters 32 to an energy monitoring system (not shown). The energy monitoring system is configured to process the performance information and present the information in a manner which is suitable for understanding the performance of and/or troubleshooting the solar power system 14. According to various aspects, the configuration and functionality of the communications unit 34 is similar or identical to the Vcomm module manufactured by eIQ Energy, Inc.

Figure 4:
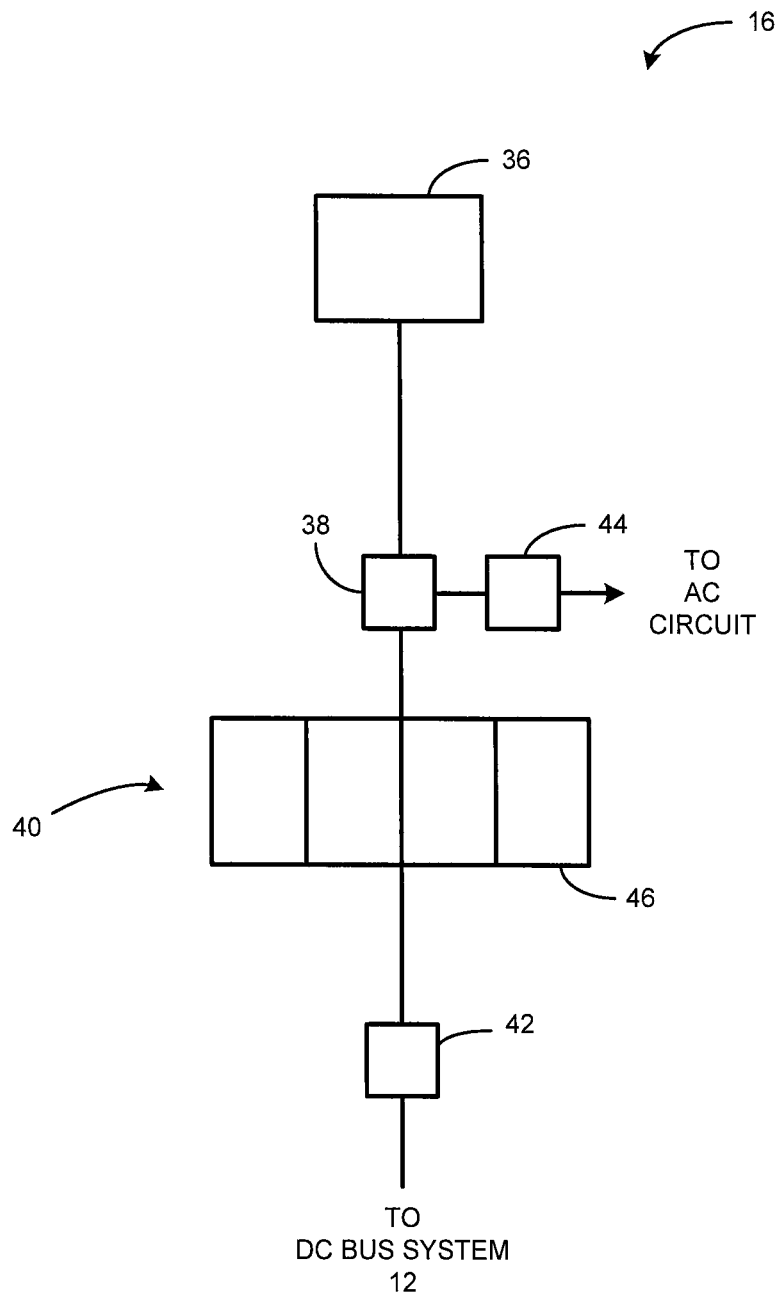
FIG. 4 illustrates various aspects of a wind power system of the DC power system of FIG. 1.

FIG. 4 illustrates various aspects of the wind power system 16. The wind power system 16 is electrically coupled to the DC bus system 12 via an appropriately sized circuit breaker and/or disconnect switch (not shown) and includes a wind turbine assembly 36, a charge controller 38, an energy storage system 40 and a DC-DC converter 42. According to various aspects, the wind power system 16 also includes an inverter 44.

Although the wind power system 16 is shown in FIG. 4 as including a single wind turbine assembly 36, it will be appreciated that the wind power system 16 may include any number of wind turbine assemblies 36. According to various aspects, the wind power system 16 is a 5 kilowatt system which includes one portable, vertical axis wind turbine (not shown) which includes a plurality of vertically-oriented blades, a generator mechanically coupled to the blades and a rectifier electrically coupled to the generator. For such aspects, rotation of the blades produces rotation of the generator, resulting in the generation of AC power. The rectifier converts the AC power to DC power at a DC voltage suitable for the energy storage system 40 (e.g., 48 VDC). The wind turbine assembly 36 may be any suitable type of wind turbine assembly. According to various aspects, the configuration and functionality of the wind turbine assembly 36 is similar or identical to the Windstax 40 wind turbine manufactured by WindStax Wind Power Systems.

Figure 5:
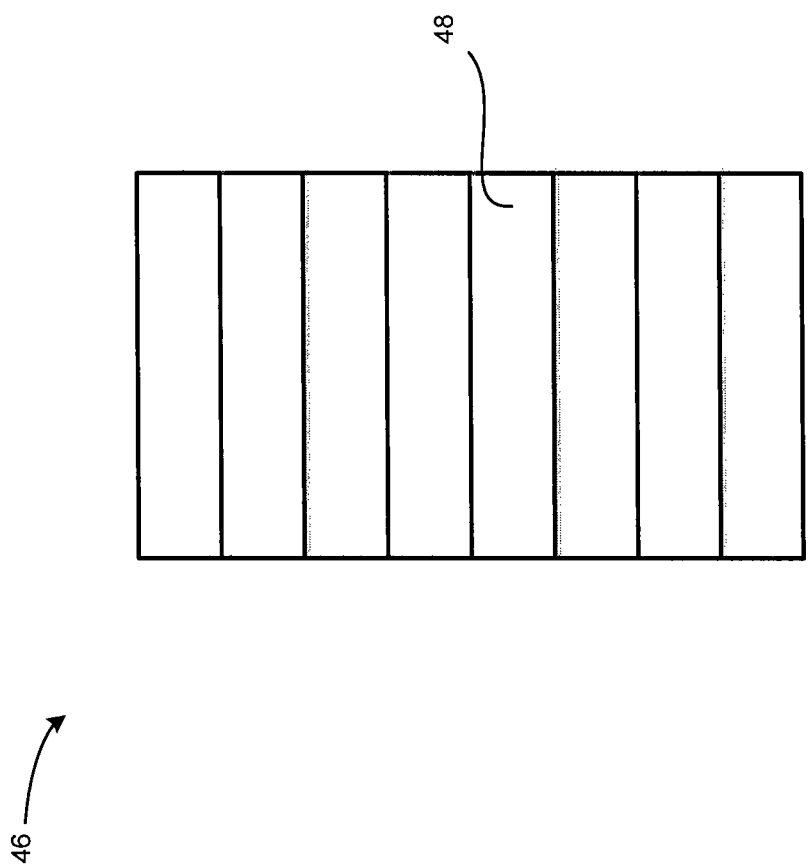
FIG. 5 illustrates various aspects of a battery stack of the wind power system of FIG. 4.

The energy storage system 40 is configured to store the DC power produced by the wind turbine assembly 36 and includes a plurality of battery stacks 46 which each have a plurality of batteries 48 (See FIG. 5) connected to one another either in series or in parallel. Although the energy storage system 40 is shown in FIG. 4 as having four battery stacks 46, it will be appreciated that the energy storage system 40 may include any number of battery stacks 46, with each battery stack 46 including any number of batteries 48. According to various aspects, the energy storage system 40 is a 9.6 kilowatt-hour energy storage system which includes four battery stacks 46, where each battery stack 46 includes eight batteries 48 (See FIG. 5) which can collectively store/deliver 2.4 kilowatt-hours of energy at 48 VDC. According to other aspects, the energy storage system 40 is a 12.0 kilowatt-hour energy storage system which includes five battery stacks 46, where each battery stack 46 includes eight batteries 48 (See FIG. 5) which can collectively store/deliver 2.4 kilowatt-hours of energy at 48 VDC. The batteries 48 of the battery stacks 46 may be any suitable type of batteries. For example, according to various aspects, the batteries 48 include a saltwater electrolyte, a manganese oxide cathode, a carbon composite anode and a synthetic cotton separator, and utilize non-corrosive reactions at the anode and cathode to prevent deterioration of the materials. According to various aspects, the configuration and functionality of the battery stacks 46 of the energy storage system 40 are similar or identical to the S20-P008F Battery Stacks manufactured by Aquion Energy. Additionally, according to various embodiments, the direct current power system 10 may further include sensors (not shown) which are utilized to monitor the temperature of the battery stacks 46 and/or the batteries 48.

The charge controller 38 is electrically coupled to the wind turbine assembly 36 and the energy storage system 40, and is configured to maintain the charge on the batteries 48 of the energy storage system 40. The charge controller 38 may be any suitable type of charge controller. According to various aspects, the configuration and functionality of the charge controller 38 is similar or identical to the MS4448PAE Inverter Charger manufactured by Magnum-Dimensions. According to various aspects, the charge controller 38 may also be electrically coupled, via an appropriately sized circuit breaker and/or disconnect switch (not shown), to an AC power system (not shown). For such aspects, the charge controller 38 may utilize a feed from the AC power system to recharge the batteries 48 as needed.

The DC-DC converter 42 is electrically coupled to the energy storage system 40 and is configured to boost the 48 VDC output from the energy storage system 40 to a DC voltage suitable for the DC bus system 12. For example, according to various aspects, the DC-DC converter 42 is configured to boost the 48 VDC output voltage from the energy storage system 40 to 380 VDC. According to various aspects, the DC-DC converter 42 may also serve as a charge controller for the wind power system 16 by boosting the output voltage of the energy storage system 40 to a DC voltage which is slightly over the existing voltage of the DC bus system 12 and then maintaining a voltage higher than the voltage of the DC bus system 12 in order to "push" current from the wind power system 16 to the DC bus system 12. According to various aspects, the DC-DC converter 42 also includes internal controls which prevent the DC-DC converter 42 from "pushing" too much current from the wind power system 16 to the DC bus system 12. According to various aspects, the DC-DC converter 42 may provide DC power to the DC bus system 12 as long as the battery stacks 46 of the energy storage system 40 remain above a predetermined charge level. If the battery stacks 46 drop below the predetermined charge level (e.g., if the voltage drops below 2.5 VDC for any battery 48), the DC-DC converter 42 may stop providing DC power to the DC bus system 12 until the battery stacks 46 are recharged by the wind turbine assembly 36. According to various aspects, if the energy storage system 18 is fully charged and there is no load electrically coupled to the DC bus system 12, the DC-DC converter 42 may be deactivated. The DC-DC converter 42 may be any suitable type of DC-DC boost converter. According to various aspects, the configuration and functionality of the DC-DC converter 42 is similar or identical to the Flatpack 2 DC/DC Converter manufactured by Eltek.

The inverter 44 is electrically coupled to the charge controller 38 and to one or more AC circuits (not shown). The inverter 44 is configured to receive DC power from the charge controller 38 and convert the DC power to AC power, which may then be provided to the one or more AC circuits. The inverter 44 may be any suitable type of inverter. According to various aspects, the configuration and functionality of the inverter 44 is similar or identical to the MS4448PAE Inverter Charger manufactured by Magnum-Dimensions.

Figure 6:
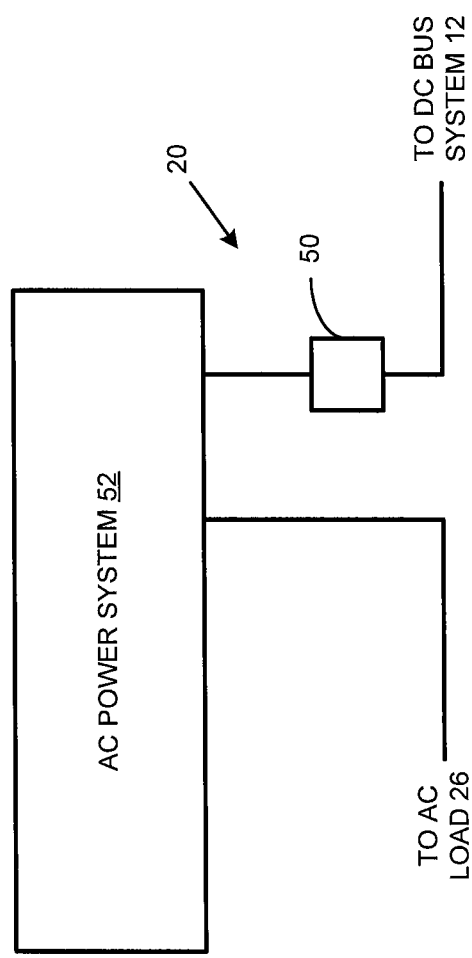
FIG. 6 illustrates various aspects of a rectifier system of the DC power system of FIG. 1.

FIG. 6 illustrates various aspects of the rectifier system 20. The rectifier system 20 includes a rectifier 50 which is electrically coupled to an AC power system 52 via an appropriately sized circuit breaker and/or disconnect switch (not shown) and is also electrically coupled to the DC bus system 12 via an appropriately sized circuit breaker and/or disconnect switch (not shown). The AC power provided by the AC power system 52 may be generated in any suitable manner. For example, the AC power may be generated by one or more hydroelectric power plants, coal-fired power plants, oil-fired power plants, natural gas-fueled power plants, nuclear power plants, etc.

The rectifier 50 is configured to convert the AC power from the AC power system 52 to DC power at a DC voltage suitable for the DC bus system 12. According to various aspects, the rectifier system 20 is a 30 kilowatt rectifier system which is configured to convert 480 VAC, 3-phase AC power from the AC power system 52 to 380 VDC. For instances where solar power system 14, the wind power system 16 and/or the energy storage system 18 are unable to provide sufficient DC power to satisfy one or more loads connected to the DC bus system 12, the rectifier system 20 may provide the necessary amount of DC power to the DC bus system 12 to satisfy the loads. According to various aspects, the rectifier system 20 includes advanced functionality such as, for example, intelligent control, metering, monitoring and distribution. For example, the rectifier 50 may include internal controls which prevent the rectifier 50 from "pushing" too much current from the rectifier system 20 to the DC bus system 12. The rectifier system 20 may be configured to operate either with or without batteries. The rectifier 50 may be any suitable type of rectifier. According to various aspects, the configuration and functionality of the rectifier 50 is similar or identical to the NetSure 4015 DC Power System manufactured by Emerson Network Power. As shown in FIG. 6, according to various aspects, the AC power system 52 may also provide AC power to the AC load 26.

Figure 7:
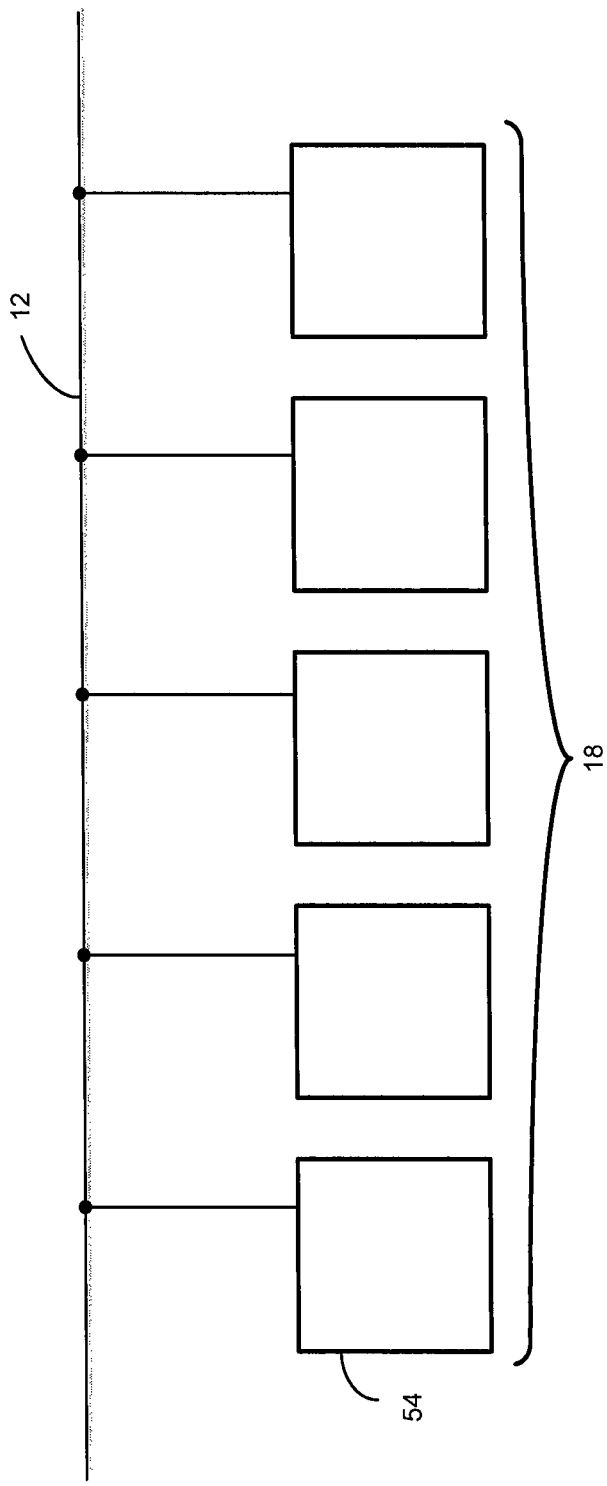
FIG. 7 illustrates various aspects of an energy storage system of the DC power system of FIG. 1.

FIG. 7 illustrates various aspects of the energy storage system 18. The input side of the energy storage system 18 is coupled to the solar power system 14 (See FIG. 2) and the output side of the energy storage system 18 is electrically coupled to the DC bus system 12. For purposes of simplicity, the electrical connections to the input side of the energy storage system 18 are not shown in FIG. 7. For these aspects, the energy storage system 18 is configured to be charged by the DC power produced by the solar power system 14, to store DC power, and discharge the DC power stored by the energy storage system 18 to the DC load 24 and/or the inverter system 22 via the DC bus system 12.

Figure 8:
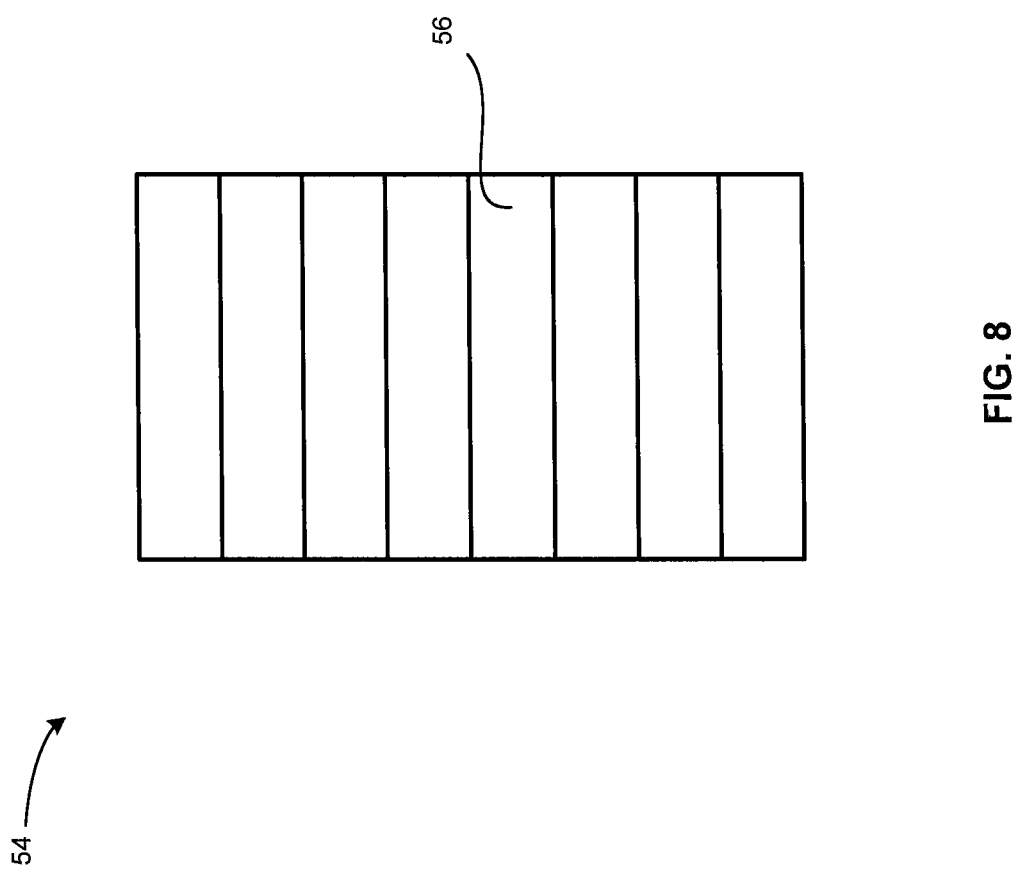
FIG. 8 illustrates various aspects of a battery stack of the energy storage system of FIG. 7.

The energy storage system 18 includes a plurality of battery stacks 54 which each have a plurality of batteries 56 (See FIG. 8) connected to one another either in series or in parallel. By connecting a plurality of the nominal 48 VDC battery stacks in series, the energy storage system 18 can provide 380 VDC of DC power to the DC bus system 12. Although the energy storage system 18 is shown in FIG. 7 as having five battery stacks 54, it will be appreciated that the energy storage system 18 may include any number of battery stacks 54, with each battery stack 54 including any number of batteries 56. According to various aspects, the energy storage system 18 includes five battery stacks 54, where each battery stack 54 includes eight batteries 56 which can collectively deliver 15 kilowatt-hours of energy at 380 VDC to the DC bus system 12. For such aspects, the batteries 56 are lithium iron phosphate (LiFePO$_4$) batteries, the configuration and functionality of the battery stacks 54 are similar or identical to the 15 KWH modular LFP Energy Banks manufactured by Elecyr Corporation and the energy storage system 18 can deliver 75 kilowatt-hours of energy at 380 VDC.

According to other aspects, the energy storage system 18 includes thirty-two battery stacks 54, where each battery stack 54 includes eight batteries 56 which can collectively deliver 2 kilowatt-hours of energy at 380 VDC to the DC bus system 12. For such aspects, the batteries 56 are saltwater batteries (they include a saltwater electrolyte, a manganese oxide cathode, a carbon composite anode and a synthetic cotton separator, and utilize non-corrosive reactions at the anode and cathode to prevent deterioration of the materials), the configuration and functionality of the battery stacks 54 are similar or identical to the S30-0800 battery stack manufactured by Aquion Energy and the energy storage system 18 can deliver 64 kilowatt-hours of energy at 380 VDC to the DC bus system 12.

The output side of each battery stack 54 is electrically coupled to the DC bus system 12 via an appropriately sized circuit breaker and/or disconnect switch (not shown). According to various aspects, the battery stacks 54 include controls which prevent the batteries 56 from becoming overcharged and prevent the batteries 56 from "pushing" too much current to the DC bus system 12. According to various aspects, the energy storage system 18 may provide DC power to the DC bus system 12 as long as the battery stacks 54 of the energy storage system 18 remain above a predetermined charge level. If the battery stacks 54 drop below the predetermined charge level (e.g., if the voltage drops below 2.5 VDC for any battery 56), the energy storage system 18 may stop providing DC power to the DC bus system 12 until the battery stacks 54 are recharged by the solar power system 14. Additionally, according to various embodiments, the direct current power system 10 may further include sensors (not shown) which are utilized to monitor the temperature of the battery stacks 54 and/or the batteries 56.

For the above-described aspects, it will be appreciated that during normal operation, (1) the energy storage system 18, which is charged by the solar power system 14, is configured to deliver the majority of the direct current power to the DC load 24 and/or the AC load 26 via the direct current bus system 12 and (2) the direct current power generated by the wind power system 16 and delivered to the direct current bus system 12 supplements the direct current power delivered to the direct current bus 12 by the energy storage system 18.

Figure 9:
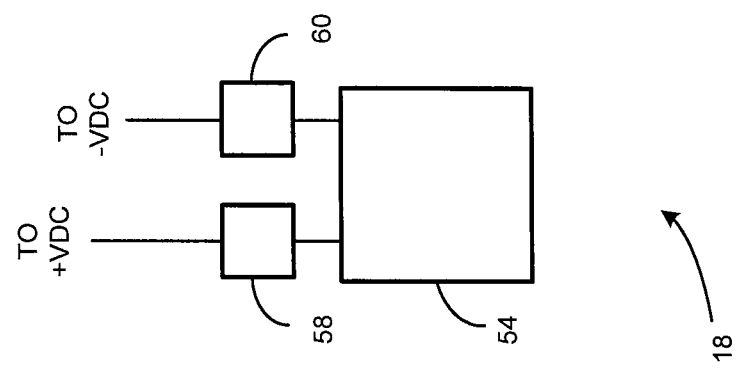
FIG. 9 illustrates the energy storage system of FIG. 7 according to other aspects.

According to other aspects, the input side of the energy storage system 18 is electrically coupled to the $-V_{DC}$ conductor of the DC bus system 12 and the output side of the energy storage system 18 is electrically coupled to the $+V_{DC}$ conductor of the DC bus system 12 (See FIG. 9). For such aspects, the batteries 56 of the energy storage system 18 may be charged with DC power supplied by the solar power system 14, the wind power system 16 and/or the rectifier system 20.

FIG. 9 illustrates the energy storage system 18 according to other aspects. For the aspects shown in FIG. 9, each battery stack 54 may be electrically coupled to the DC bus system 12 via a pair of charge controllers 58, 60 and appropriately sized circuit breakers and/or disconnect switches (not shown). For purposes of simplicity, only one of the charge controllers 58 and one of the charge controllers 60 are shown in FIG. 9. The charge controllers 58 control current flowing from the DC bus system 12 to the battery stacks 54 (i.e., charging controllers) and the charge controllers 60 control current flowing from the battery stacks 54 to the DC bus system 12 (i.e., discharging controllers). The "charging" charge controllers 58 include circuitry (not shown) which operates to allow DC power to only flow in one direction from the DC bus system 12 to the battery stacks 54 and the "discharging" charge controllers 60 include circuitry (not shown) which operates to allow DC power to only flow in one direction from the battery stacks 54 to the DC bus system 12. According to various aspects, each "charging" charge controller 58 also includes bypass circuitry (not shown) which operates to limit the DC current flowing from the DC bus system 12 to the battery stack 54 to a nominal minimum for slow charging the batteries 56. According to various aspects, each "discharging" charge controller 60 also includes bypass circuitry (not shown) which operates to limit the DC current flowing from the battery stacks 54 to the DC bus system 12 to a nominal minimum for pre-charging (or soft-starting) the DC bus system 12. As separate connections are utilized to connect a given battery stack 54 to the $+V_{DC}$ conductor and the $-V_{DC}$ conductor of the DC bus system 12, it will be appreciated that the energy storage system 18 can independently control its charging and discharging. According to various aspects, all of the DC power provided by the solar power system 14, the wind power system 16 and/or the inverter system 20 may be provided to charge the battery stacks 54 of the energy storage system 18, and the energy storage system 18 may provide all of the DC power to the loads connected to the DC bus system 12.

Figure 10:
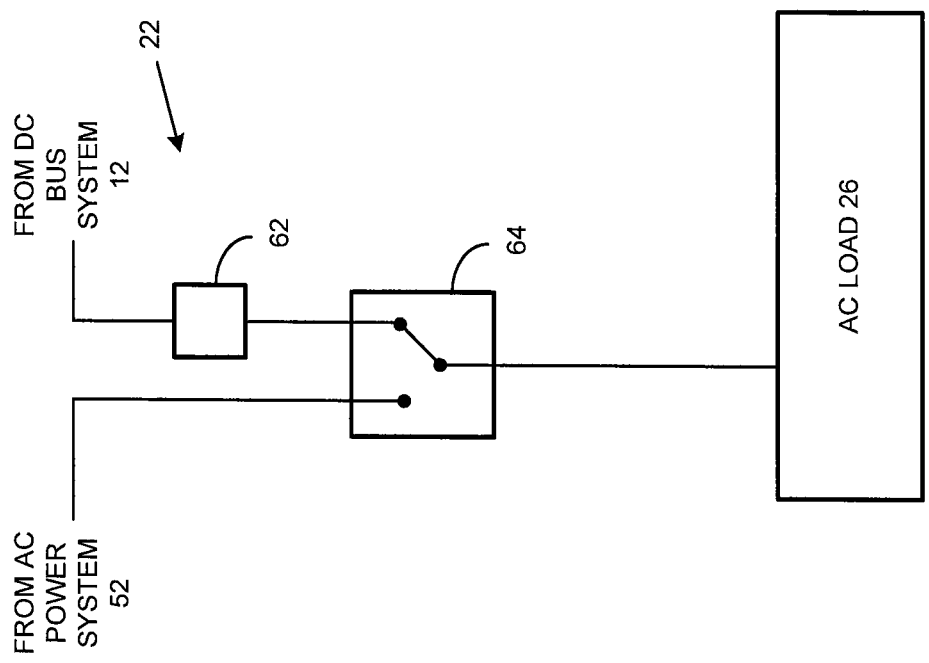
FIG. 10 illustrates various aspects of an inverter system of the DC power system of FIG. 1.

FIG. 10 illustrates various aspects of the inverter system 22. The inverter system 22 includes an inverter 62, is electrically coupled to the DC bus system 12 via an appropriately sized circuit breaker and/or disconnect switch (not shown), and is also electrically coupled to the AC load 26 via an appropriately sized circuit breaker and/or disconnect switch (not shown). The inverter 62 is configured to convert the DC power from the DC bus system 12 to AC power at an AC voltage suitable for the AC load 26. Such suitable AC voltages may include, for example, 120 VAC, 208 VAC, 240 VAC, 277 VAC and/or 480 VAC. According to various aspects, the inverter system 22 is a 40 kilowatt inverter system which is configured to convert 380 VDC to 480 VAC for utilization by the AC load 26. The AC load 26 may be any suitable type of AC load. For example, according to various aspects, the AC load 26 is a lighting circuit which requires 277 volts of single-phase AC power to properly operate. According to other aspects, the AC load 26 is an air conditioning unit which requires 480 volts of three-phase AC power to properly operate. For applications where the DC power system 10 is to provide AC power to AC loads 26 having different AC voltage requirements, the inverter system 22 may include additional inverters 62 to convert the DC power from the DC bus system 12 to AC power at the AC voltages suitable for the different AC loads 26.

According to various aspects, the inverter 62 includes a digital signal processor (DSP) which utilizes pulse width modulation (PWM) to control insulated-gate bipolar transistors (IGBT) to convert the DC power from the DC bus system 12 to AC power at an AC voltage suitable for the AC load 26. The inverter 62 may be any suitable type of inverter. According to various aspects, the configuration and functionality of the inverter 62 is similar or identical to a 40 KVA Power Inverter manufactured by Power Conversion Technologies, Inc.

As shown in FIG. 10, according to various aspects, the inverter system 22 may further include an automatic transfer switch 64 electrically coupled to the inverter 62 and positioned between the inverter 62 and the above-referenced appropriately sized circuit breaker and/or disconnect switch (not shown) electrically coupled to the AC load 26. The automatic transfer switch 64 may also be electrically coupled to the AC power system 52. The automatic transfer switch 64 is configured to allow AC power from either the AC power system 52 or the inverter system 22/inverter 62 to be electrically connected to the AC load 26. According to various aspects, during normal operation, the automatic transfer switch 64 connects the inverter 62 to the AC load 26 and allows the AC power to flow from the output side of the inverter 62 to the AC load 26. During such operation, the automatic transfer switch 64 effectively disconnects the AC power system 52 from the AC load 26. However, if the DC power system 10 fails or if the AC power from the inverter 62 is not sufficient to meet the AC load 26, the automatic transfer switch 64 may automatically disconnect the inverter 62 from the AC load 26 and connect the AC power system 52 to the AC load 26.

EXAMPLES

Example 1

A direct current power system is provided. The direct current power system comprises a direct current bus system, a solar power system, an energy storage system, a wind power system, a rectifier system and an inverter system. The solar power system comprises a plurality of solar panels, wherein the solar power system is configured to supply a first direct current power at 48 volts. The energy storage system is electrically coupled to the solar power system and the direct current bus system, wherein the energy storage system comprises a plurality of battery stacks, and wherein the energy storage system is configured to supply a second direct current power at 380 volts to the direct current bus system. The wind power system is electrically coupled to the direct current bus system, wherein the wind power system comprises at least one wind turbine assembly, and wherein the wind power system is configured to supply a third direct current power at 380 volts to the direct current bus system. The rectifier system is electrically coupled to an alternating current power system and the direct current bus system, wherein the rectifier system is configured to supply a fourth direct current power at 380 volts to the direct current bus system. The inverter system is electrically coupled to the direct current bus system and electrically couplable to an alternating current load.

Example 2

The direct current power system of Example 1, wherein the solar power system further comprises a photovoltaic charge controller electrically coupled to the plurality of plurality of solar panels and the energy storage system.

Example 3

The direct current power system of Example 1, wherein the solar power system further comprises a plurality of DC-DC converters electrically coupled to the plurality of solar panels.

Example 4

The direct current power system of Examples 1, 2 or 3, wherein each battery stack comprises a plurality of batteries.

Example 5

The direct current power system of Example 4, wherein the at least one of the battery stacks comprises a plurality of saltwater batteries.

Example 6

The direct current power system of Examples 1, 3, 4 or 5, wherein the energy storage system further comprises (1) a first plurality of charge controllers electrically coupled to the energy storage system and a positively charged conductor of the DC bus system and (2) a second plurality of charge controllers electrically coupled to the energy storage system and a negatively charged conductor of the DC bus system.

Example 7

The direct current power system of Examples 1, 2, 3, 4, 5 or 6, wherein the at least one turbine assembly comprises a vertical axis turbine assembly.

Example 8

The direct current power system of Examples 1, 2, 3, 4, 5, 6 or 7, wherein the wind power system further comprises (1) a charge controller electrically coupled to the at least one wind turbine assembly, (2) an energy storage subsystem electrically coupled to the charge controller and (3) a DC-DC converter electrically coupled to the energy storage subsystem and the direct current bus system.

Example 9

The direct current power system of Example 8, wherein the energy storage subsystem comprises a plurality of battery stacks.

Example 10

The direct current power system of Example 9, wherein each battery stack comprises a plurality of batteries.

Example 11

The direct current power system of Examples 9 or 10, wherein at least one of the battery stacks comprises a plurality of saltwater batteries.

Example 12

The direct current power system of Examples 8, 9, 10 or 11, wherein the wind power system further comprises an inverter electrically coupled to the charge controller.

Example 13

The direct current power system of Examples 1, 2, 3, 4, 5, 6, 7, 8, 9, 10, 11 or 12, wherein the rectifier system comprises a rectifier configured to convert alternating current power from the alternating current power system to the fourth direct current power.

Example 14

The direct current power system of Examples 1, 2, 3, 4, 5, 6, 7, 8, 9, 10, 11, 12 or 13, wherein the inverter system comprises an inverter configured to convert direct current power from the direct current bus system to alternating current power.

Example 15

The direct current power system of Example 14, wherein the inverter system further comprises an automatic transfer switch electrically coupled to the inverter, the alternating current power system and the alternating current load.

Example 16

A direct current power system is provided. The direct current power system comprises a solar power system, a wind power system, an energy storage system, a rectifier system and a 380 volt direct current bus system. The solar power system comprises a plurality of solar panels, wherein the solar power system is configured to output a first direct current power. The wind power system comprises at least one wind turbine assembly, wherein the wind power system is configured to output a second direct current power. The energy storage system comprises a plurality of battery stacks, wherein the energy storage system is electrically coupled to the solar power system and is configured to output a third direct current power. The rectifier system is configured to supply a fourth direct current power. The 380 volt direct current bus system is electrically coupled to the wind power system, the energy storage system and the rectifier system.

Example 17

The direct current power system of Example 16, wherein the solar power system further comprises a communications unit configured to (1) monitor performance of the solar power system and (2) communicate performance information regarding the solar power systems.

Example 18

The direct current power system of Examples 16 or 17, further comprising an inverter system electrically coupled to the 380 volt direct current bus system.

Example 19

A direct current power system is provided. The direct current power system comprises a 380 volt direct current bus system, a solar power system, means for storing energy, a wind power system and a rectifier system. The solar power system comprises a plurality of solar panels, wherein the solar power system is configured to generate a first direct current power. The means for storing energy is electrically coupled to the solar power system and is configured to supply a second direct current power to the 380 volt direct current bus system. The wind power system is configured to supply a third direct current power to the 380 volt direct current bus system. The rectifier system is configured to supply a fourth direct current power to the 380 volt direct current bus system.

Example 20

The direct current power system of Example 19, further comprising an inverter system electrically coupled to the 380 volt direct current bus system.

Although various aspects have been described herein, many modifications, variations, substitutions, changes and equivalents to those aspects may be implemented and will occur to those skilled in the art. For example, although the solar power system 14 and the wind power system 16 were described in the context of being able to operate in conjunction with an AC power system 52, it will be appreciated that the solar power system 14, the wind power system 16, the energy storage system 18 and the DC bus system 12 may be able to operate in conjunction with any number of renewable and/or non-renewable energy sources. The solar power system 14, the wind power system 16, the energy storage system 18 and the DC bus system 12 may be able to operate in conjunction with any number of different AC power systems (e.g., hydroelectric, coal-fired, oil-fired, natural gas-fueled, nuclear, etc.) and/or any number of other sources of DC power.

Additionally, although exemplary "capacities" have been described in connection with various components of the direct current power system 10 (50 KW solar power system, 5 KW wind power system, 64-75 KW energy storage system, 30 KW rectifier, etc.), it will be appreciated that according to other aspects of the direct current power system 10 the respective capacities can vary, sometimes significantly. For example, based on the geographic location of the direct current power system 10, the parameters of the weather generally associated with the geographic location, the number of DC loads 24 to be powered by the direct current power system 10, the amount of power which needs to be delivered to the DC load(s) 24, the number of AC loads 26 to be powered by the direct current power system 10, the amount of power which needs to be delivered to the AC load(s) 26, etc., the capacities of the various components of the direct current power system 10 can be tailored to best meet the needs of a given application. For example, for some applications, the wind power system 16 may supply a higher percentage of or even a majority of the direct current power delivered to the direct current bus system 12.

Also, where materials are disclosed for certain components, other materials may be used. It is therefore understood that the foregoing description and the appended claims are intended to cover all such modifications and variations as falling within the scope of the disclosed aspects. The following claims are intended to cover all such modifications and variations.

While this invention has been described as having exemplary designs, the described invention may be further modified within the spirit and scope of the disclosure. This application is therefore intended to cover any variations, uses, or adaptations of the invention using its general principles.

What is claimed is:

1. A direct current power system, comprising:
a direct current bus system;
a solar power system comprising a plurality of solar panels, wherein the solar power system is configured to supply a first direct current power at 48 volts;
an energy storage system having an input electrically coupled to the solar power system and an output electrically coupled to the direct current bus system, wherein the energy storage system comprises a plurality of battery stacks, and wherein the energy storage system is configured to supply a second direct current power at 380 volts to the direct current bus system;
a wind power system electrically coupled to the direct current bus system, wherein the wind power system comprises at least one wind turbine assembly, and wherein the wind power system is configured to supply a third direct current power at 380 volts to the direct current bus system;
a rectifier system electrically coupled to an alternating current power system and the direct current bus system, wherein the rectifier system is configured to supply a fourth direct current power at 380 volts to the direct current bus system; and
an inverter system electrically coupled to the direct current bus system and electrically couplable to an alternating current load.

2. The direct current power system of claim 1, wherein the solar power system further comprises a photovoltaic charge controller electrically coupled to the plurality of solar panels and the energy storage system.

3. The direct current power system of claim 1, wherein the solar power system further comprises a plurality of DC-DC converters electrically coupled to the plurality of solar panels.

4. The direct current power system of claim 1, wherein each battery stack comprises a plurality of batteries.

5. The direct current power system of claim 4, wherein at least one of the battery stacks comprises a plurality of saltwater batteries.

6. The direct current power system of claim 1, wherein the energy storage system further comprises:
   a first plurality of charge controllers electrically coupled to the energy storage system and a positively charged conductor of the DC bus system; and
   a second plurality of charge controllers electrically coupled to the energy storage system and a negatively charged conductor of the DC bus system.

7. The direct current power system of claim 1, wherein the at least one turbine assembly comprises a vertical axis turbine assembly.

8. The direct current power system of claim 1, wherein the wind power system further comprises:
   a charge controller electrically coupled to the at least one wind turbine assembly;
   an energy storage subsystem electrically coupled to the charge controller; and
   a DC-DC converter electrically coupled to the energy storage subsystem and the direct current bus system.

9. The direct current power system of claim 8, wherein the energy storage subsystem comprises a plurality of battery stacks.

10. The direct current power system of claim 9, wherein each battery stack comprises a plurality of batteries.

11. The direct current power system of claim 9, wherein at least one of the battery stacks comprises a plurality of saltwater batteries.

12. The direct current power system of claim 8, wherein the wind power system further comprises an inverter electrically coupled to the charge controller.

13. The direct current power system of claim 1, wherein the rectifier system comprises a rectifier configured to convert alternating current from the alternating current power system to the fourth direct current power.

14. The direct current power system of claim 1, wherein the inverter system comprises an inverter configured to convert direct current power from the direct current bus system to alternating current power.

15. The direct current power system of claim 14, wherein the inverter system further comprises an automatic transfer switch electrically coupled to the inverter, the alternating current power system and the alternating current load.

16. A direct current power system, comprising:
   a solar power system comprising a plurality of solar panels, wherein the solar power system is configured to output a first direct current power;
   a wind power system comprising at least one wind turbine assembly, wherein the wind power system is configured to output a second direct current power;
   an energy storage system comprising a plurality of battery stacks, wherein the energy storage system has an input electrically coupled to the solar power system and is configured to output a third direct current power;
   a rectifier system configured to supply a fourth direct current power; and
   a 380 volt direct current bus system electrically coupled to the wind power system, the energy storage system and the rectifier system.

17. The direct current power system of claim 16, wherein the solar power system further comprises a communications unit configured to:
   monitor performance of the solar power system; and
   communicate performance information regarding the solar power system.

18. The direct current power system of claim 16, further comprising an inverter system electrically coupled to the 380 volt direct current bus system.

19. A direct current power system, comprising:
   a 380 volt direct current bus system;
   a solar power system comprising a plurality of solar panels, wherein the solar power system is configured to generate a first direct current power;
   means for storing energy, wherein the means for storing energy has an input electrically coupled to the solar power system and is configured to supply a second direct current power to the 380 volt direct current bus system;
   a wind power system configured to supply a third direct current power to the 380 volt direct current bus system; and
   a rectifier system configured to supply a fourth direct current power to the 380 volt direct current bus system.

20. The direct current power system of claim 19, further comprising an inverter system electrically coupled to the 380 volt direct current bus system.

* * * * *